United States Patent
Feigin et al.

(10) Patent No.: US 8,115,667 B2
(45) Date of Patent: Feb. 14, 2012

(54) HIGHWAY SPEED GROUND PENETRATING RADAR SYSTEM UTILIZING AIR-LAUNCHED ANTENNA AND METHOD OF USE

(75) Inventors: Jeffrey R Feigin, Andover, MA (US); Alan E Schutz, Newburyport, MA (US)

(73) Assignee: Geophysical Survey Systems, Inc., Salem, NH (US)

( * ) Notice: Subject to any disclaimer, the term of this patent is extended or adjusted under 35 U.S.C. 154(b) by 303 days.

(21) Appl. No.: 12/620,012

(22) Filed: Nov. 17, 2009

(65) Prior Publication Data

US 2011/0115666 A1    May 19, 2011

(51) Int. Cl.
G01S 13/88 (2006.01)
G01S 7/40 (2006.01)

(52) U.S. Cl. ............. 342/22; 342/27; 342/174; 342/175

(58) Field of Classification Search ............... 342/22, 342/27, 174, 175
See application file for complete search history.

(56) References Cited

U.S. PATENT DOCUMENTS

| | | | |
|---|---|---|---|
| 3,831,173 A * | 8/1974 | Lerner | 342/22 |
| 4,706,031 A * | 11/1987 | Michiguchi et al. | 324/337 |
| 5,063,529 A | 11/1991 | Chapoton | |
| 5,248,975 A * | 9/1993 | Schutz | 342/21 |
| 5,384,715 A | 1/1995 | Lytton | |
| 5,499,029 A | 3/1996 | Bashforth et al. | |
| 5,835,053 A | 11/1998 | Davis | |
| 6,127,966 A | 10/2000 | Erchage | |
| 6,429,802 B1 | 8/2002 | Roberts | |
| 6,650,276 B2 * | 11/2003 | Lawless | 342/28 |
| 6,670,906 B1 * | 12/2003 | Roberts et al. | 342/22 |
| 6,700,526 B2 | 3/2004 | Witten | |
| 6,741,201 B1 | 5/2004 | De Jongth et al. | |
| 6,838,671 B2 | 1/2005 | Compana et al. | |
| 7,034,740 B2 * | 4/2006 | Witten | 342/22 |
| 7,460,053 B2 * | 12/2008 | Zemany et al. | 342/22 |
| 2007/0069943 A1 * | 3/2007 | Adams et al. | 342/130 |
| 2011/0115666 A1 * | 5/2011 | Feigin et al. | 342/22 |

OTHER PUBLICATIONS

Thin-Pavement Thickness Estimation Using GPR With High-Resolution and Superresolution Methods wrtten by Bastard; Cedric Le, Baltazart; Vincent, Wang; Yide, and Saillard; Joseph. Published in IEEE Transactions on Geoscience and Remote Sensing, vol. 45, No. 8, Aug. 2007.

* cited by examiner

Primary Examiner — John Sotomayor
(74) Attorney, Agent, or Firm — Michael J. Feigin, Esq.

(57) ABSTRACT

Embodiments of the disclosed technology comprise an air-launched antenna system with interference-rejection technology that operates in analog hardware as well as by way of a digital filtering technique. Using an inline analog hardware filter combined with a digital filter, to determine transversal (and/or recursive) coefficients, in a calibration phase, a measurement system may be configured to remove interference and the effects (such as a delay or temperature variation) which result from use of an analog filter. In this manner, the resulting measurements of a composition of road surface are more accurate and useful.

21 Claims, 7 Drawing Sheets

HIGHWAY SPEED GROUND PENETRATING RADAR SYSTEM UTILIZING AIR-LAUNCHED ANTENNA AND METHOD OF USE

FIELD OF THE DISCLOSED TECHNOLOGY

The disclosed technology relates generally to ground penetrating radar (GPR), and more specifically, to a technique for removal of radio frequency (RF) interference in a GPR system.

BACKGROUND OF THE DISCLOSED TECHNOLOGY

GPR, or ground-penetrating RADAR (where RADAR is "RAdio Detection And Ranging), is a technology used to assess the composition and location of heterogeneous materials. GPR uses common radio frequencies and is particularly useful in that it is both non-destructive and non-ionizing. In fact, GPR uses frequencies similar to a cellular phone, but at far lower power levels. Common applications include locating the precise position of rebar within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface and internal layer composition of less than one inch (2.54 cm) is desired. Such systems may be mounted on vehicles, passing over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

There are two common types of GPR for road/bridge surface measurement: Ground-coupled and air-launched. Each has drawbacks. Ground-coupled systems rely upon an antenna that is placed very close to the roadway/surface. At high speeds, the acquired data becomes unusable or the resolution is greatly diminished due to vibrations or even damage to the ground-coupled antenna itself. In fact, the maximum feasible speed of use known in the art is no more than about 15 kph (10 mph), which is highly inefficient, when, for example, there is a need to detect flaws in a long stretch of a six-lane highway with regular traffic flow.

Air-launched systems, on the other hand, utilize antennas aimed at the surface from a height of 30-50 cm (12-20 inches). Unfortunately, air-launched systems, while allowing higher speeds of travel (e.g., at the 105 KPH/65 MPH speed limit of many highways) with less vibration than ground-coupled systems, tend to return very low resolution or unusable data due to interference from sources such as FM (frequency modulation) radio and television (TV) broadcasting. For detailed project-level work, such as bridge deck investigations, if near a major TV transmitter or cellular/PCS transmitter, use of the air-launched antenna becomes impossible. For such cases, alternate data collection methods, using ground-coupled antennas, are currently necessary.

While analog filters are known in the art and may be used to remove unwanted frequencies (e.g., FM or TV broadcasts) from an air-launched system, all known implementable analog filter systems (filters that operate on voltages, currents, or mechanical vibrations) exhibit variations in time delay at different frequencies. A UWB transmission is one in which the bandwidth extends at least the smaller of 500 MHz or 20% of the center frequency. Such a transmission becomes distorted and blurred after passing through such an analog filter. It becomes unknown which changes are due to road surface variations and which are due to the effects of the filter, and the pulse is unrecoverable. Alternatively, digital filters that operate either in software or in the digital hardware of a RADAR system are capable of performing filtering without introducing any kind of 'blurring,' but cannot remove the residual effects of overloading that occur in the analog circuitry.

Thus, there remains an unsolved need in the art to provide a GPR system capable of operating at high speeds, such as regular roadway speeds, which provides acceptable data for use in detecting roadway problems.

SUMMARY OF THE DISCLOSED TECHNOLOGY

Therefore, it is an object of the disclosed technology to provide an interference-rejection technique that allows air-launched antennas to operate in the presence of the most prevalent, strongest, and most widespread interference sources that one would encounter in highway and bridge measurement scenarios.

It is further an object of the disclosed technology to preserve the resolution of measurement data in an air-launched antenna GPR system.

It is still a further object of the disclosed technology to improve the resolution of measurement data in an air-launched antenna GPR system.

Embodiments of the disclosed technology comprise an air-launched antenna system with interference-rejection technology that operates in analog hardware as well as by way of a digital filtering technique. This technique utilizes specially designed hardware filters that remove the influence of the interference but preserve the recoverable information of the RADAR backscatter (reflection received from a road surface when using a GPR technique). In the method of use, the measured impulse response is adjusted for maximum resolution. The resulting waveform is thus stripped of most of the interference sources, and the level of detail is improved even beyond that of a conventional air-launched antenna, without interference.

A ground-penetrating radar system, in an embodiment of the disclosed technology, comprises an air-launched transceiver (e.g., a "horn antenna"), an inline analog interference rejection filter (e.g., a passive or active filter having a specific configuration of S-plane poles and zeros designed to minimize the reception of RF energy at the bands in which detrimental interference is known to occur), an analog to digital converter, a delay-tap filter (such as an infinite impulse response filter (IIR) or finite impulse response filter (FIR), and a measurement system for determining the composition of a heterogeneous material. The inline analog interference rejection filter may comprise an analog filter (which has response that is usually characterized in terms of S-plane poles and zeros), and the delay-tap filter may be used to mitigate group delay distortion effects caused by the analog filter.

The analog filter may be a single filter (such as a programmable filter) or a plurality of filters (such as an array). In either case, the operation of a filter in the array or programmable filter, at a specific time, may be only on a specific subset of frequencies, such as on the frequencies where interference may be anticipated or has been found to be problematic at a specific or general location (e.g., along a certain highway, near a certain transmitter or city, etc.).

The air-launched transceiver of the ground penetrating radar system, in embodiments of the disclosed technology, is mounted on a vehicle above the heterogeneous material, e.g., above a road surface to be measured, such as six inches or more above the ground. Distances may range from one tenth of an inch to ten feet, inclusive.

A method for calibrating a ground-penetrating radar system is also disclosed. The method comprises the use of an air-launched transceiver to reflect an ultra-wide band signal off a homogeneous material, using an inline (or somewhere in the receiver signal chain) analog rejection filter to block a selection of frequencies in the reflected signal based on anticipated (e.g., predicted or previously detected) interference from external signals, and shaping the reflected signal by way of a digital filter to at least partially restore the ultra-wide band signal. Then, transversal coefficients are determined at a temperature or a plurality of temperatures in the prior step of shaping, to shape a reflection of an ultra-wide band signal off a heterogeneous material.

The homogeneous material may be a metal plate. The heterogeneous material may be a road surface. The air-launched transceiver may be positioned six inches or more from (e.g., above) the road surface during the shaping of the signal reflected off the road surface.

The inline analog interference rejection filter may comprise an S-plane analog filter and the digital filter may mitigate group delay distortion effects caused by the analog filter. The analog filter may comprise one or a plurality of filters, each one or a plurality of filters capable of operation on a designated subset of frequencies.

A ground-penetrating radar measurement device, in an embodiment of the disclosed technology, comprises means for transmitting and receiving a radio signal (e.g., a horn antenna or other antenna), analog filtering means (such as a passive or active analog filter), digital filtering means (such as an IIR or FIR filter), means for determining transversal coefficients associated with the digital or delay-tap filter to at least partially restore said transmitted radio signal, and means for measuring a composition of a heterogeneous material, such as a device including a display (e.g., TFT monitor), storage, logical function ability, and the like.

The means for transmitting and receiving the radio signal may comprise an antenna that may be situated six inches or greater above the heterogeneous material, the antenna safely mounted on a stopped or traveling vehicle, and traveling at regular highway/roadway speeds relative to the ground, in embodiments of the disclosed technology. Such speeds may be any speed between a stopped condition and a highway allowable speed, such as 10 mph, 50 mph, 65 mph, or higher. The composition may be measured to a resolution of at least one inch (that is, having the ability to resolve the composition at one inch or smaller intervals), and the resolution may be more precise as a result of use of said digital filter.

The digital filtering means may be calibrated based on a measured reflection of the radio signal and the reflection may be a reflection off a homogeneous material. The digital filtering means may be further calibrated based on a cost function.

DETAILED DESCRIPTION OF EMBODIMENTS OF THE DISCLOSED TECHNOLOGY

Embodiments of the disclosed technology include an air-launched antenna system with interference-rejection technology that operates in analog hardware, as well as by way of a digital filtering technique. This technique utilizes specially designed hardware filters that remove the influence of the interference but preserve the recoverable information of the radar backscatter (reflection received from a road surface when using a GPR technique). Using an inline analog hardware filter combined with a digital filter, to determine transversal (and recursive) coefficients, in a calibration phase, a measurement system may be configured to remove interference and the effects (such as a delay or temperature variation) which result from use of an analog filter. In this manner, the resulting measurements of a composition of road surface are more accurate and useful.

Figure 1:
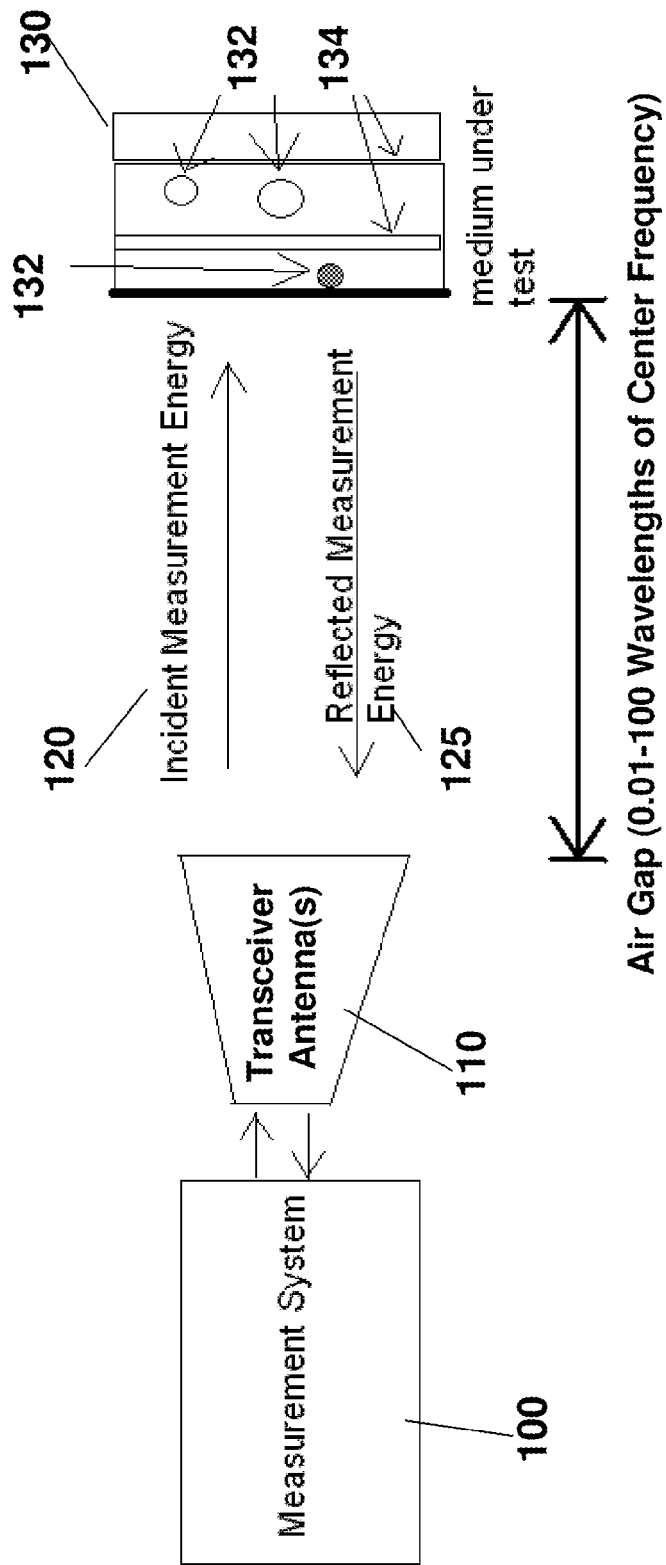
FIG. 1 shows a high level block diagram of an air-launched ultra-wide band ground penetrating radar system which may be used to carry out embodiments of the disclosed technology.

FIG. 1 shows a high level block diagram of an air-launched ultra-wide band ground penetrating radar system which may be used to carry out embodiments of the disclosed technology. A measurement system 100 receives and carries out measurement functions on a reflected RF (radio frequency) signal. The measurement system may also direct the incident RF signal to be transmitted. The measurement system may be one comprising any or a plurality of logic, computational inputs and outputs, oscilloscope, TFT (thin-film transistor) LCD (liquid crystal display) monitor, and ability to execute code. A measurement system may also comprise elements such as those shown and described further with reference to FIG. 2 and FIG. 7, as well as the prior art cited in the background section. An antenna 110, such as a directional antenna, horn antenna, and/or a plurality thereof, is an air-launched antenna which propagates an RF signal towards a material to be analyzed. Any antenna known in the art which is capable of propagating and/or receiving an RF signal may be used in embodiments of the disclosed technology. Such an antenna or antennas may comprise one antenna transmitting a signal, another receiving a signal, a single antenna both transmitting and receiving, or an array of antennas carrying out such functions. The RF signal is typically a UWB (ultra wide-band) transmission. A UWB transmission is one in which the bandwidth extends at least the smaller of 500 MHz or 20% of the center frequency. In a calibration step, the RF signal is reflected off a homogeneous material, such as a metal plate (not shown). In an analysis step, i.e., during an analysis of a heterogeneous material to determine its makeup, the RF signal is reflected off the heterogeneous material, such as heterogeneous material 130. The heterogeneous material 130 may be a road surface.

In the example shown in FIG. 1, various voids, fissures, or impurities 132 are shown. The transition lines 134 mark the boundary between one material and the next. Materials, in a roadway surface, may comprise a chip surface, pavement layers, gravel, and so forth. The incident measurement energy 120 is transmitted from the directional antenna 110, reflects off the heterogeneous (or homogeneous) material 130, and the reflected measurement energy 125 is measured. In practical applications where the heterogeneous material 130 is a road surface, it should be understood that the elements of FIG. 1 are rotated clockwise 90 degrees. In such an embodiment of the disclosed technology, the closest point of the antenna to the ground is between one tenth of an inch and 10 feet (310 cm) from the ground, such as at 1" (2.54 cm) or 6" (15.24 cm).

Figure 2:
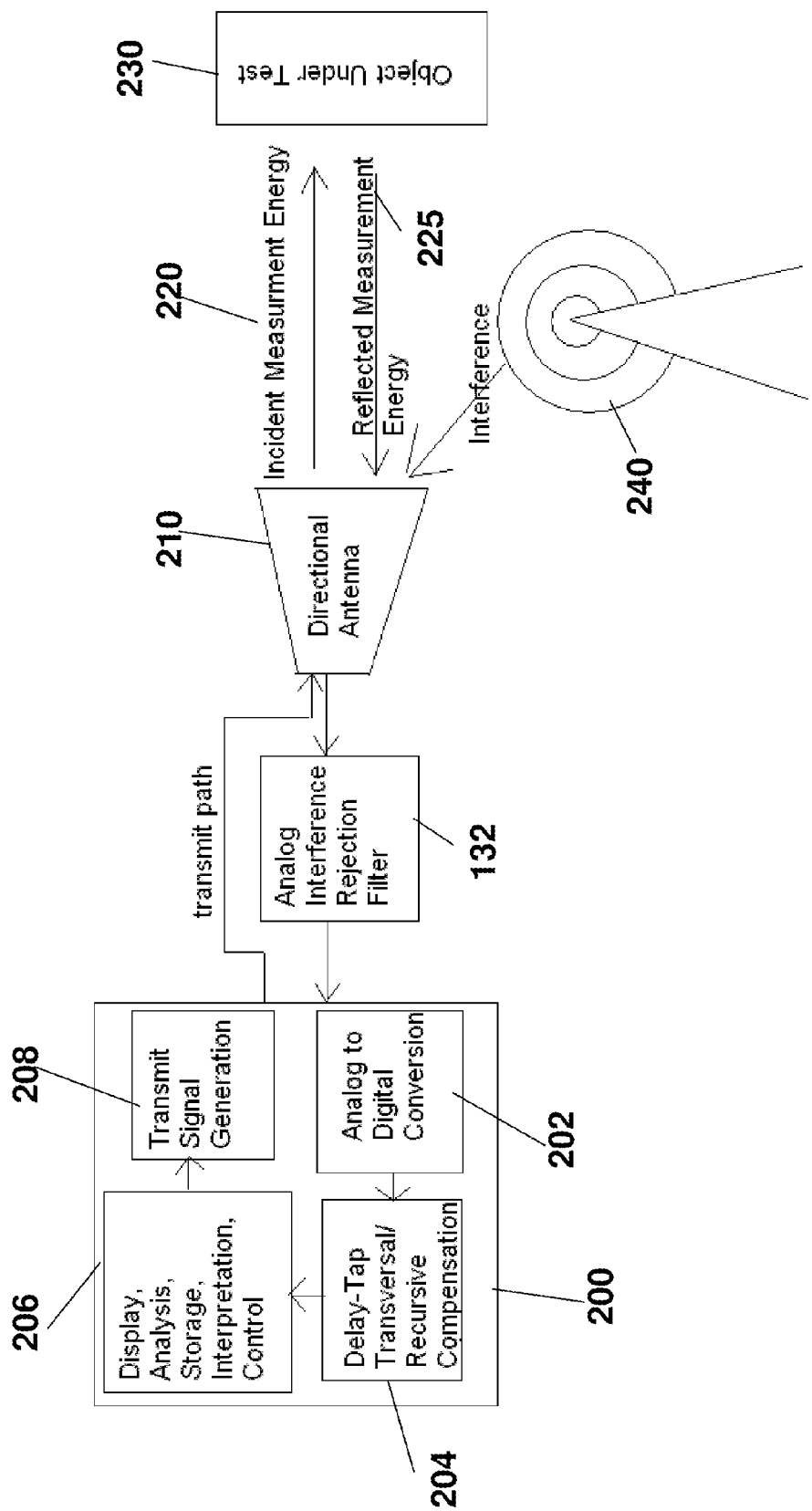
FIG. 2 shows a high level block diagram of an air-launched ultra-wide band ground penetrating radar system with digital and analog filters which may be used to carry out embodiments of the disclosed technology.

FIG. 2 shows a high level block diagram of an air-launched ultra-wide band ground penetrating radar system with digital and analog filters which may be used to carry out embodiments of the disclosed technology. FIG. 2 is a more detailed version of FIG. 1, and, where possible, elements shown in FIG. 1 have been incremented by 100 in FIG. 2. The measurement system 200 comprises a signal generator 208 which generates a signal (pulse) typically between the frequencies of 500 MHz and 2.5 GHz or any range between. The signal is typically in the form of short pulses of high-frequency Electromagnetic waves, such as radio waves, into the medium to be analyzed 230 (object under test) via a antenna 210. The frequencies used may be all at once or added separately using principals of superposition. An antenna 210, such as a horn antenna or other antenna propagates the signal. It is also noted that this system may also use separate transmitter/receiver instead of a single common antenna. The incident measurement energy 220 is reflected off an object under test 230. The problem which the present technology solves to a large degree is that the reflected measurement energy 225 is often combined with interference 240. Thus, the antenna receives not only the reflected measurement energy 225 (that is, a reflection of the signal transmitted from the signal generator 208), but also interference 240 from devices such as FM radio and TV transmitters. Such transmitters transmit common radio and television broadcasts, emergency response traffic (e.g., fire, police, ambulance), cellular phones, and so forth.

Therefore, in the disclosed technology, an analog interference rejection filter 132 is placed in a path between the measurement system 200 and object under test 230. While the analog interference rejection filter 132 shown in FIG. 2 is placed between the direction antenna 132 and measurement system 200 on the path of the reflected measurement energy. The analog filter may be a passive or active filter, have a specific configuration of s-plane poles and zeros, and be designated to minimize the reception of RF energy at the bands in which detrimental interference is known to occur (e.g., based on prior-measured interference in a specific geographic location) or anticipated to occur (e.g., based on an event occurring during testing such as a nearby parade with certain police/emergency frequencies in use). When using an analog interference rejection filter 132, such as an s-plane analog filter, the resulting reflected measurement energy 225 becomes distorted and has a longer duration than an unfiltered version. In reality, all implementable hardware filters (filters that operate on voltages, currents, or mechanical vibrations as opposed to those that operate upon digital representations of these signals), with the level of rejection required for ground penetrating radar, exhibit variations in time delay at different frequencies and distort and blur the UWB radar data.

Thus, in the disclosed technology, a delay-tap transversal filter 204 which may further comprise recursive compensation is used. This digital filter technology operates either in software or in the digital hardware of the radar system/measurement system and is capable of performing filtering without the blurring that occurs with analog filters. A digital filter alone would not be sufficient because digital filters are incapable of removing the residual effects of overloading that occur in the analog circuitry, such as the transmit signal generation 208, antenna 210, and so forth. The digital filter may comprise either an infinite impulse response (IIR) or a finite impulse response (FIR). As described with reference to at least FIG. 1 and FIG. 3, the response of the digital filter is determined based in part on a calibration phase, whereby the transmit signal generation 208 is transmitted through the antenna 210 and the object under test 230 is a metal plate or homogeneous material. The response of the digital filter/ delay-tap transversal filter 204 is then calibrated so as to "recover" the signal or waveform of the transmit signal. It should also be understood that between the reflected measurement signal 225 (analog signal) obtained by the antenna 210 and the digital filter is an analog to digital converter 202. The purpose of this device is to convert the analog signal generated at 208 into a digital signal which is processable by the delay-tap transversal filter 204. A display, analysis, storage, interpretation, and control center 206 is also disclosed and shown which comprises features such as an LCD display, ability to execute logical functions and calculations, store data in hardware memory, and the like.

Figure 3:
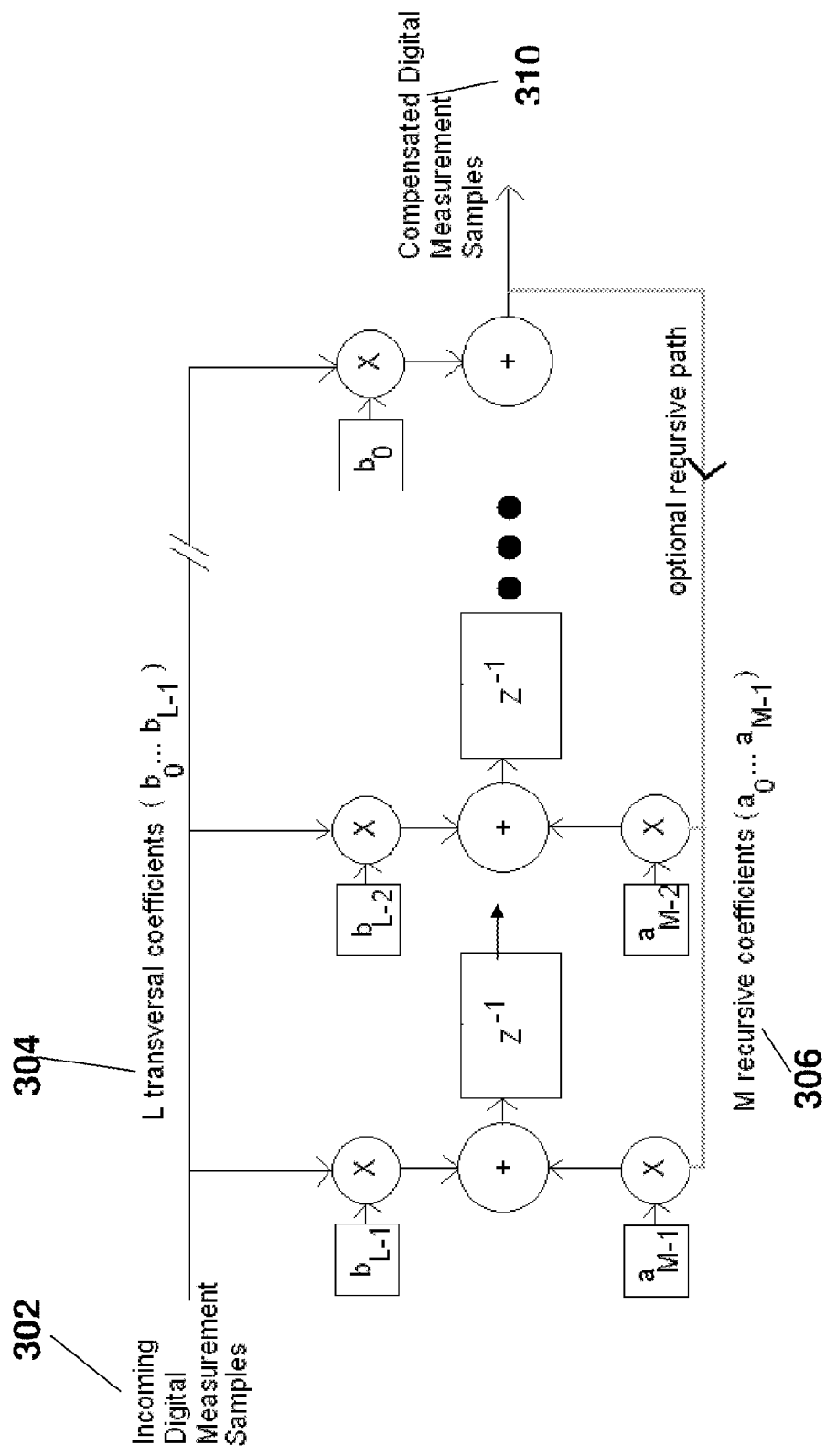
FIG. 3 shows a block diagram of the functions of the delay-tap transversal/recursive compensation filtering device 204 of FIG. 2.

FIG. 3 shows a block diagram of the functions of the delay-tap transversal/recursive compensation filtering device 204 of FIG. 2. The delay-tap transversal filter and/or the recursive compensation module is/are implemented using a microprocessor, microcontroller, programmable logic device, field-programmable gate array (FPGA), complex programmable logic device (CPLD), or similar device. The delay-tap coefficients are initialized as a pragmatic inverse of the expected response of the in-line hardware filter. The required number of L and M coefficients is dependent upon the group delay variation of the hardware filter. This digital functionality can be equivalently implemented in the frequency domain rather than the time domain, by manipulating the transfer functions of the measurement rather than its time domain impulse or near-impulse response. This hardware filter is implemented using some combination of integrated circuit technology, discrete components, electrical resonators, electro-mechanical resonators, cavity resonators, transmission line resonators, patterned substrates, and similar devices and materials, in order to achieve the desired response that removes as much of the unwanted interference as possible while minimizing pulse distortion. The coefficient set for the compensation block may be updated and fine-tuned upon 1) manufacture of the specific device, 2) at regular intervals, 3) at specific measurement time, and 4) varied with temperature. The specific technique for setting and updating these coefficients is to use the optimization of a cost function (e.g., least squares minimization) between the desired waveform and the measured waveform under controlled circumstances.

Referring still to FIG. 3, incoming digital measurement samples 302 are received by the delay-tap filter from the digital to analog converter 202. Transversal coefficients 304 are multiplied and summed and adjusted based on a determined delay (e.g., $Z^{-1}$). Any number of transversal coefficients 304 may be determined and compensated for before producing compensated digital measurement samples on a one to one basis for each incoming digital measurement sample 302 (interpolation or dropping of unusable measurements may provide a greater or smaller number of output samples). An optional recursive path is shown whereby recursive coefficients 306 are determined based on a compensation sample 310 which is used to further adjust, recursively, the measurement samples.

Figure 4:
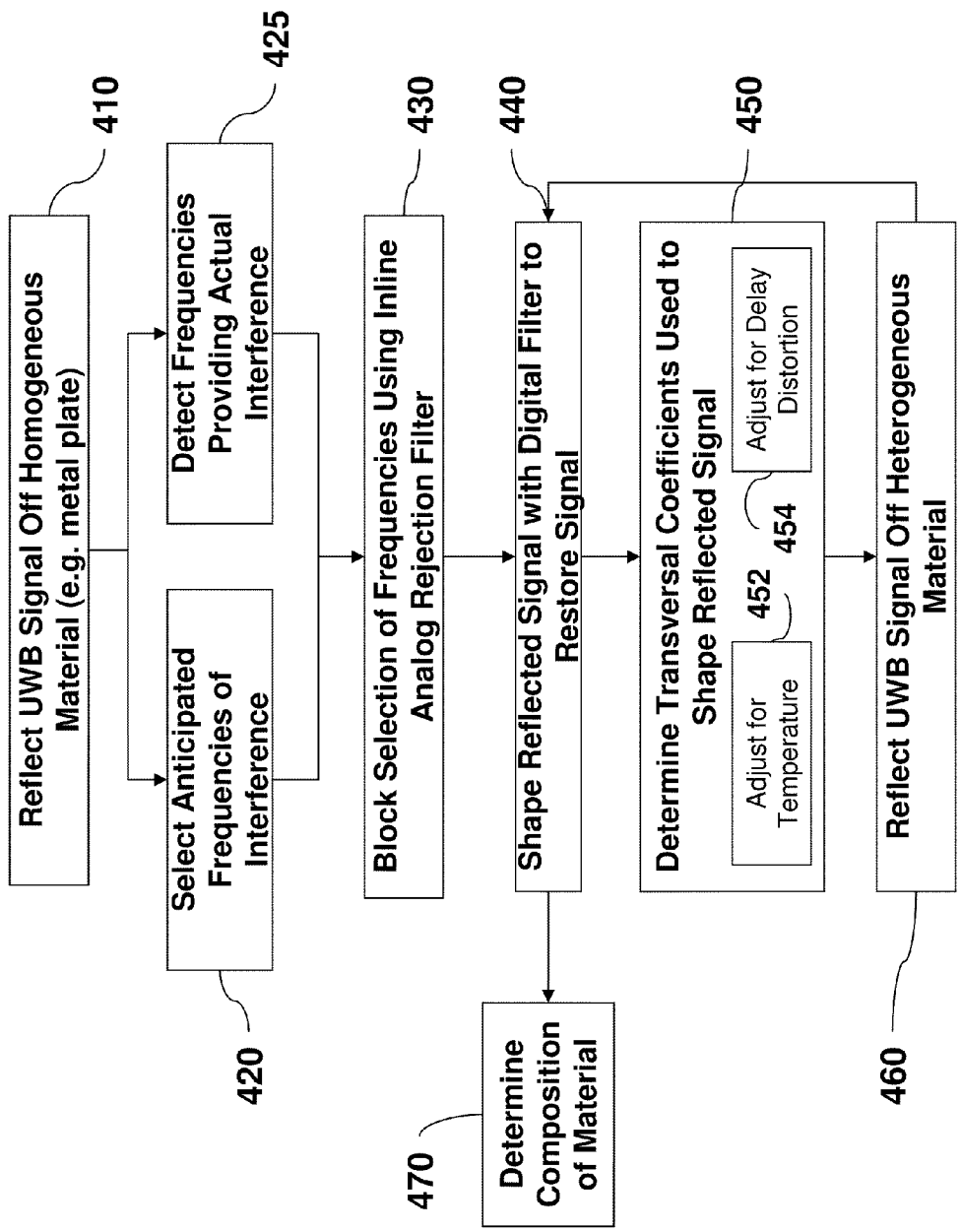
FIG. 4 shows the steps taken to determine the composition of a material in an embodiment of the disclosed technology.

FIG. 4 shows the steps taken to determine the composition of a material in an embodiment of the disclosed technology. In step 410, during a calibration phase, a UWB signal is reflected off a homogeneous material, such as a metal plate. Using such a homogeneous material provides a very clear reflected signal. During this calibration phase the analog and digital filters are adjusted to allow the resulting waveform to be as strong/clear or stronger/clearer than the incident waveform (where stronger is defined as having a higher amplitude and clearer is defined as having a smoother or more predicable shape, e.g., less interference). Either or both of steps 420 and 425 are carried out. In step 420, a selection of wavelengths (frequencies) of anticipated interference is made. As described with reference to FIGS. 1 and 2, the interference sources, such as TV, radio, and phone transmission, may be anticipated based on location (near a strong or many transmitters such as near or in a city). Alternatively, or in addition, step 425 may be carried out where frequencies of interference are detected based on prior travel along a route where a heterogeneous material composition (road surface composition) is to be measured. Stops may be made at intervals or upon a change in the usefulness of a reflected signal to recalibrate, comprising selecting frequencies currently providing actual interference, which are anticipated to cause interference more along the route.

However the frequencies to block are selected, in step 430, using an analog filter, such as an inline analog rejection filter, the selection of frequencies is blocked. Analog filter, in this sense, is defined as a single analog filter which is configured to block selected frequencies or a plurality of analog filters, whereby a subset of the analog filters is activated and each analog filter blocks a selected wavelength or range of wavelengths. Thus, a single or a plurality of analog filters acting in concert may be used in embodiments of the disclosed technology at any given time, route, or iteration of use.

A digital filter, in the manner shown and described with reference to FIG. 3, is then implemented in step 440 to shape the reflected signal (measurement energy). In this manner, the transmitted signal is at least partially recovered, correcting for delay distortion and effects of temperature and other factors. As shown in step 450, the transversal coefficients (and other data, such as recursive coefficients, in embodiments of the disclosed technology) are determined. These transversal coefficients may vary and be adjusted for temperature changes in step 452 and delay distortion in step 454. Thus, the digital filter corrects for errors brought into the system by the analog filter. Using these data, in step 460, a user then reflects a UWB signal off of a heterogeneous material, such as a road surface, and is able to shape the reflected signal. Thus, step 440 is carried out again whereby a reflected signal is shaped with a digital filter to restore the signal. This time, however, instead of proceeding to step 450, step 470 is carried out, whereby the composition of the material tested (in this case, a heterogeneous material such as a road surface) is determined.

Figure 5:
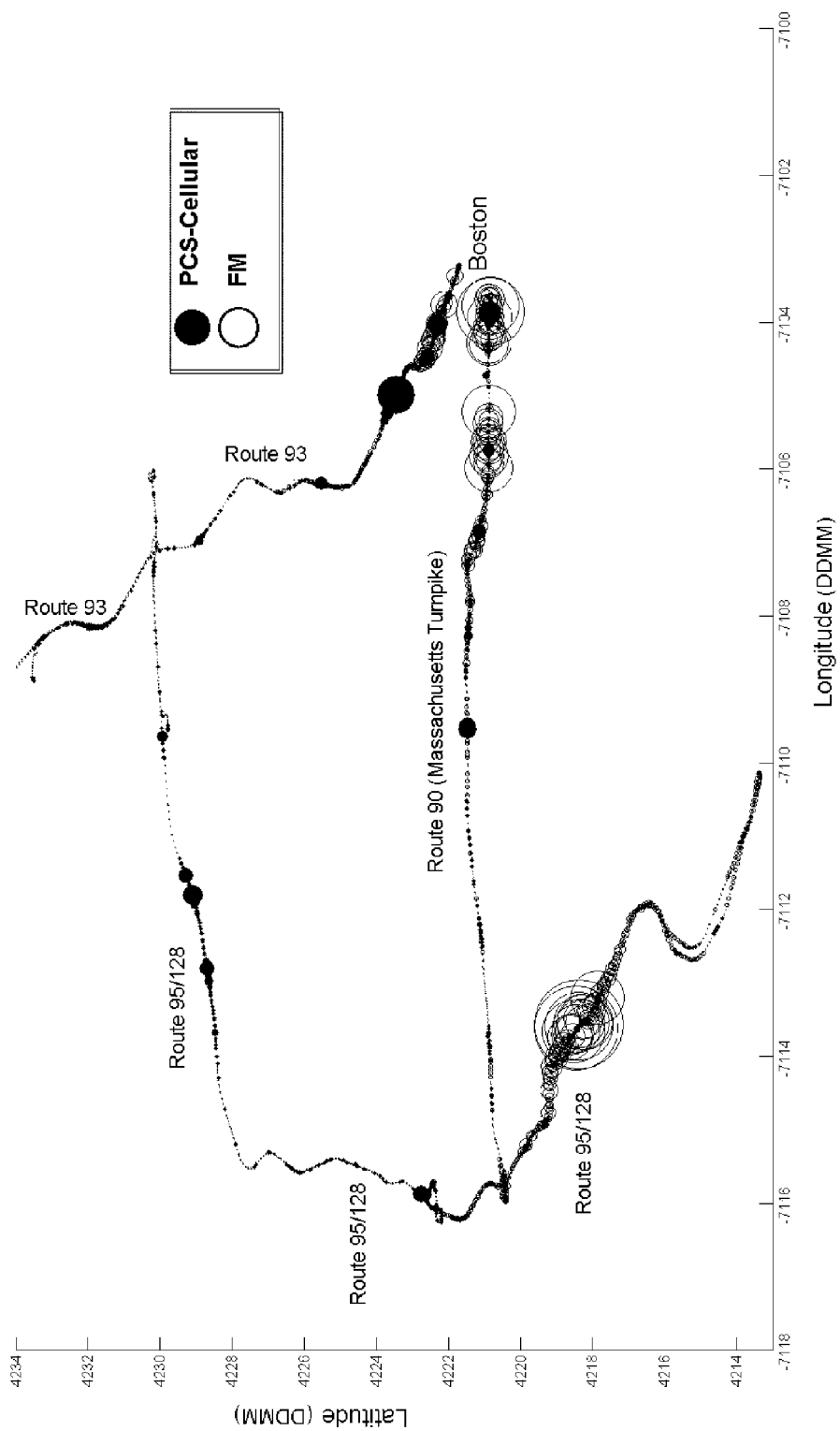
FIG. 5 shows a sampling of actual interference sources and their relative strengths detected while carrying out an embodiment of the disclosed technology.

FIG. 5 shows a sampling of actual interference sources and their relative strengths detected while carrying out an embodiment of the disclosed technology. The sample is over a 2.5 mile stretch of roadway. PCS-Cellular interference, which includes other cellular interference as well as miscellaneous interference, was primarily detected near cellular towers, such as outside of Boston along Interstate 90, as well as in and near Boston. FM interference, as is expected, is detected near major FM transmitters. At such locations, which practically speaking, may be along a 0.1 to 5 miles stretch of roadway a reflected UWB signal is unusable by means of a horn antenna. Thus, based on the anticipated or determined interference at such locations, or along the stretch of highway in general, the incident or reflected UWB signal is reshaped digitally after passing through an analog filter.

Figure 6:
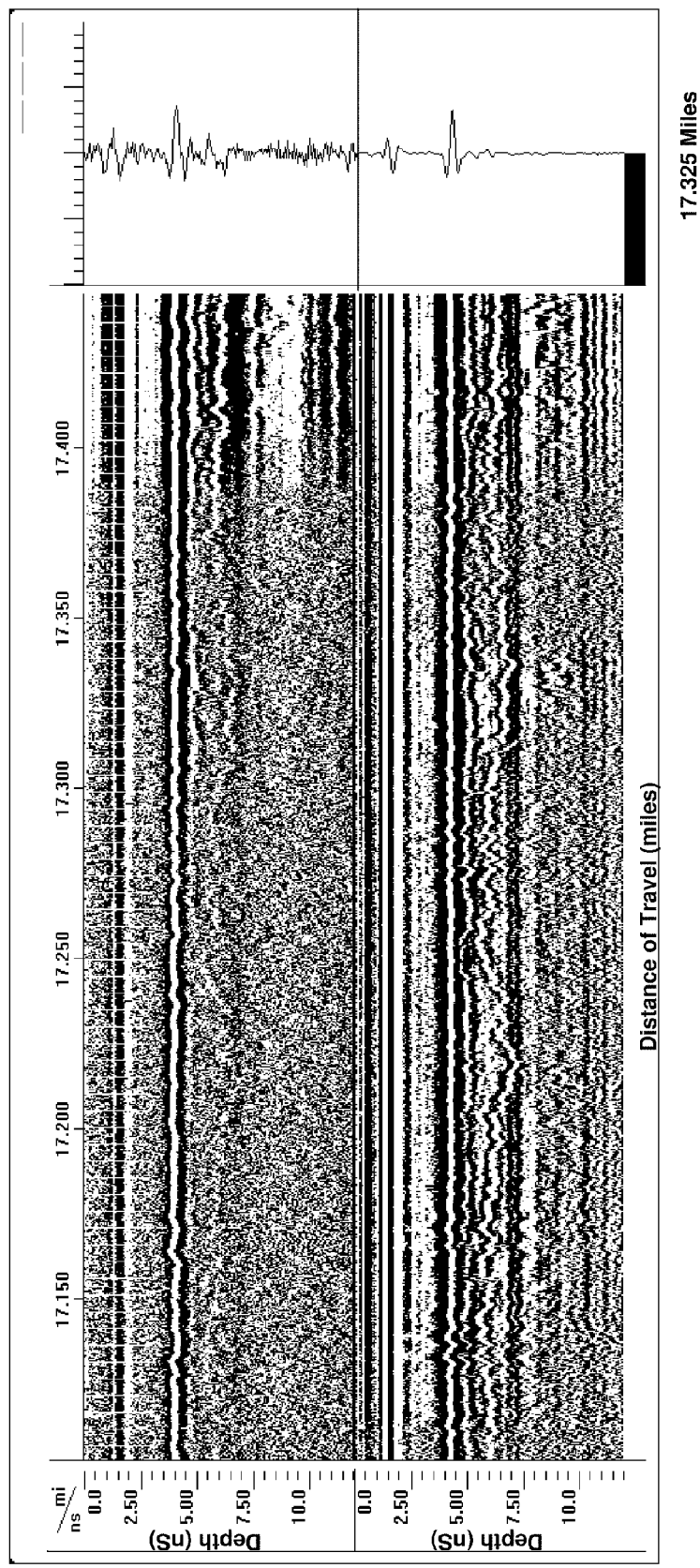
FIG. 6 shows sample data along a stretch of roadway using an air-launched antenna without and with the disclosed technology.

FIG. 6 shows sample data along a stretch of roadway using an air-launched antenna without and with the disclosed technology. The upper left graph shows a road surface at about 4 nS (nanoseconds of time taken to reflect back to a receiver/antenna). Beneath the road surface the data is unusable from the 17.000 mile marker until almost the 14.400 mile marker. The upper graph shows ample interference, as represented in this black and white version of the data, as pixilated dots due to dithering, similar to the snow of an analog TV where there is no signal, e.g., overriding interference. The lower graph, however, is over the same roadway, using an analog filter (to filter out unwanted frequencies) and digital filter (to restore the original signal) and results in usable data, the subsurface layers being more clearly visible below 4 nS. Previously unusable data becomes marginally usable (as defined below; see FIG. 5) and marginally usable data becomes usable data along much of the path travelled where interference previously rendering the data less usable or unusable. The graph on the right side of FIG. 6, at 17.325 miles the data has been extracted. While a peak at 4 nS is shown in each, considerably more noise is shown in the upper graph, especially below 4 nS (the road surface) making it difficult or impossible to distinguish layers below the road surface. In the lower graph, however, the lower amplitude peaks shown in the graph are distinguishable below 4 nS, as further layers.

In a real world test of the route shown in FIG. 5, it was found that an air-launched antenna suffered outages 20% of the time while the results were either acceptable or excellent 80% of the time. The level of interference in the GPR data was obtained by measuring the highest positive peak amplitude over a 0.5 ns time range in a dead zone occurring prior to the arrival of the direct-coupling reflection, then calculated its level, in dB, relative to the peak amplitude of the reflection from a metal plate (heterogeneous material) placed on the surface of the pavement. The reflection amplitudes from the pavement bottom typically range from −20 to −35 dB below the metal plate reflection.

TABLE 1

| Interference Level | GPR Classification |
| --- | --- |
| >−32 dB | Unusable |
| −38 to −32 dB | Marginal |
| −44 to −38 dB | Acceptable |
| <−44 dB | Excellent |

Table 1 shows the acceptability of data garnered using a GPR system, for purposes of this example. The unacceptable filtered antenna data, using the disclosed technology, was less than 4%, compared to 22% of the unfiltered data (e.g., without the analog and digital filtering system of the disclosed technology). The above test involved ample highway testing. In urban environments, the unusable data is considerably higher than 22%. Furthermore, 84% of the data using the disclosed technology were classified as excellent, compared to 60% when using an antenna without filters. This is defined as comprising an interference level at least 44 dB below the amplitude of the reflection from a metal plate. At this interference level, not only will pavement bottom reflections typically be detected, but also inner pavement reflections and perhaps the base-subbase interface.

Figure 7:
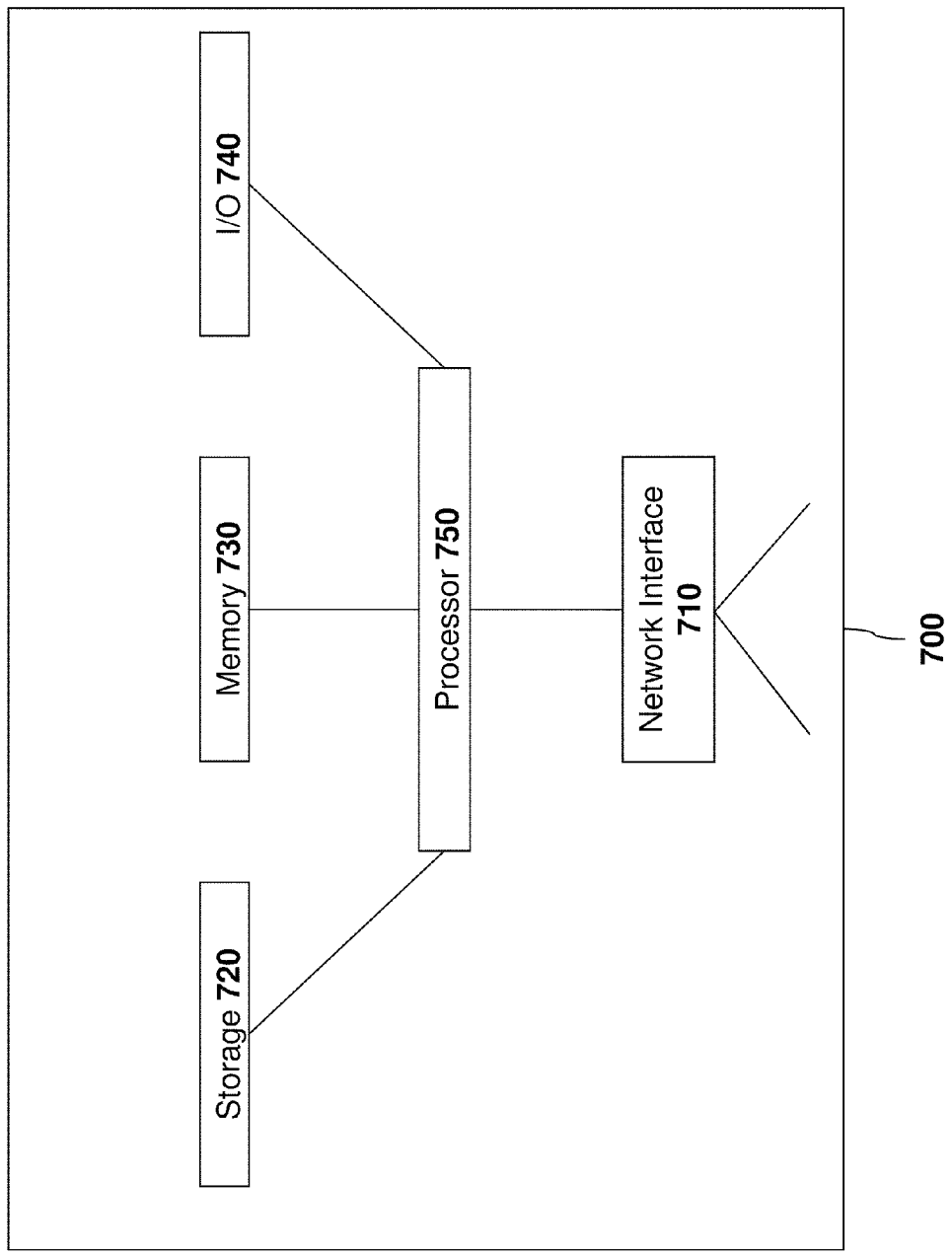
FIG. 7 shows a high-level block diagram of a measurement device that may be used to carry out the invention.

FIG. 7 shows a high-level block diagram of a measurement device that may be used to carry out the invention. Measurement device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A measurement device 700 also includes one or a plurality of input network interfaces for communicating with other devices via a network (e.g., the internet). A measurement device 700 also includes one or more output network interfaces 710 for communicating with other devices. Measurement device 700 also includes input/output 740 representing devices which allow for user interaction with the computer 700 (e.g., display, keyboard, mouse, speakers, buttons, etc.). One skilled in the art will recognize that an implementation of an actual measurement device will contain other components as well, and that FIG. 7 is a high level representation of some of the components of such a measurement device for illustrative purposes. It should also be understood by one skilled in the art that the method and devices depicted in FIGS. 1 through 4 may be implemented on a device such as is shown in FIG. 7.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

We claim:

1. A ground penetrating radar system comprising:
   an air-launched transmitter and receiver configured to transmit and receive signals;
   an inline analog interference rejection filter configured to block a selection of said signals received by said air-launched transmitter and receiver;
   an analog to digital converter configured to convert analog signals outputted by said inline analog interference rejection filter to digital data;
   a delay-tap filter configured to shape said digital data;
   a measurement system for determining the composition of a heterogeneous material based on output of said delay-tap filter.

2. The ground-penetrating radar system of claim 1, wherein said inline analog interference rejection filter comprises an analog filter.

3. The ground penetrating radar system of claim 2, wherein said delay-tap filter further comprises devices adapted to mitigates group delay distortion effects caused by said analog filter.

4. The ground penetrating radar system of claim 3, wherein said analog filter comprises one or a plurality of filters, each said one or a plurality of filters capable of operation on a designated subset of frequencies.

5. The ground penetrating radar system of claim 4, further comprising a system for determining anticipated interference, and wherein said inline analog interference rejection filter further comprises a device capable of selecting a frequency range of filtering based on anticipated interference.

6. The ground-penetrating radar system of claim 4, further comprising a device configured to determine actual interference and said inline analog interference rejection filter comprises a device capable of selecting a frequency range of filtering based on said actual interference.

7. The ground penetrating radar system of claim 1, wherein said air-launched transceiver is mounted on a vehicle at least one tenth of an inch above said heterogeneous material.

8. A method for calibrating a ground penetrating radar system comprising:
   using an air-launched transceiver to reflect an ultra-wide band signal off a homogeneous material;
   using an inline analog rejection filter to block a selection of frequencies in a reflected said signal based on anticipated interference from external signals;
   shaping said reflected signal with a digital filter to at least partially restore said ultra-wide band signal; and
   using transversal coefficients determined in said prior step of shaping to shape a reflection of an ultra-wide band signal off a heterogeneous material.

9. The method of claim 8, wherein said homogeneous material is a metal plate.

10. The method of claim 8, wherein said heterogeneous material is a road surface.

11. The method of claim 10, wherein said air-launched transceiver is positioned at least six inches from said road surface during said shaping of said signal reflected off said road surface.

12. The method of claim 8, wherein said inline analog interference rejection filter comprises an analog filter and said digital filter mitigates group delay distortion effects caused by said analog filter.

13. The method of claim 12, wherein said analog filter comprises one or a plurality of filters, each said one or a plurality of filters capable of operation on a designated subset of frequencies.

14. The method of claim 8, wherein said transversal coefficients vary based on temperature.

15. A ground penetrating radar measurement device comprising:
   means for transmitting and receiving a radio signal;
   analog filtering means receiving said radio signal;
   digital filtering means receiving output of said analog filtering means;
   means for determining transversal co-efficients associated with said digital filter to at least partially restore said transmitted radio signal;
   means for measuring a composition of a heterogeneous material based on a partially restored transmitted radio signal created by said means for determining transversal co-efficients.

16. The ground penetrating radar measurement device of claim 15, wherein said means for transmitting and receiving said radio signal comprises an antenna situated at least one tenth of an inch above said heterogeneous material.

17. The ground penetrating radar measurement device of claim 15, wherein said antenna is mounted on a vehicle traveling at speeds above 10 miles per hour.

18. The ground penetrating radar measurement device of claim 15, wherein said means for measuring a composition of a heterogeneous material further comprise means for measuring said composition to a resolution of at least one inch.

19. The ground penetrating radar measurement device of claim 16, wherein said digital filtering means further comprises means for producing a resolution more precise than said received output of said analog filtering means.

20. The ground penetrating radar measurement device of claim 15, wherein said digital filtering means are calibrated using a device which transmits said radio signal and receives a measured reflection of said radio signal off a homogeneous material.

21. The ground penetrating radar measurement device of claim 15, wherein said digital filtering means are further calibrated based on a device which calculated based on a cost function.

* * * * *